(12) United States Patent
Niino et al.

(10) Patent No.: US 6,698,904 B1
(45) Date of Patent: Mar. 2, 2004

(54) SAFETY DEVICE FOR TELESCOPE

(75) Inventors: Masao Niino, Gamagori (JP); Yoshihide Goto, Gamagori (JP); Shiroh Iiyama, Gamagori (JP)

(73) Assignee: Kowa Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/070,046
(22) PCT Filed: Aug. 25, 2000
(86) PCT No.: PCT/JP00/05725
§ 371 (c)(1), (2), (4) Date: Feb. 22, 2002
(87) PCT Pub. No.: WO01/16638
PCT Pub. Date: Mar. 8, 2001

(30) Foreign Application Priority Data

Aug. 27, 1999 (JP) .............................. 11-241263

(51) Int. Cl.⁷ ........................ G02B 26/00; H01J 31/50
(52) U.S. Cl. ...................... 359/613; 359/399; 359/297; 359/601; 250/214 VT
(58) Field of Search ............... 359/399–409, 359/601–614; 250/203.1, 203.4, 205

(56) References Cited

U.S. PATENT DOCUMENTS 3,273,458 A * 9/1966 Kohler ...................... 359/247
3,602,576 A * 8/1971 Kohler et al. ............... 359/297
5,729,010 A * 3/1998 Pinkus et al. ........... 250/214 VT

FOREIGN PATENT DOCUMENTS

| GB | 2 043 944 | * | 10/1980 | ................ 359/601 |
| JP | 7-27983 | * | 1/1995 | |
| JP | 7-19718 | * | 4/1995 | |
| JP | 10-153740 | * | 6/1998 | |

* cited by examiner

Primary Examiner—Thong Nguyen
(74) Attorney, Agent, or Firm—Adams & Wilks

(57) ABSTRACT

A ray of light incident via a pin hole (6) and a field stop (7) having a field of vision a predetermined angle larger than a telescope's actual field of vision that are disposed on an axis (5) in parallel to the optical axis (4) of the telescope is measured in intensity by a photoelectric element (8). When a quantity of light incident on the photoelectric element is larger than a predetermined quantity of light, a shutter (11) is inserted into an optical path of the telescope to cut off a ray of light going into the eyes of the observer. Since an incidence of a quantity of light in excess of a predetermined one into a field of vision a predetermined angle larger than the actual field of vision of the telescope will block the optical path of the telescope, a risk such as damage to the eyes of the observer can be eliminated to prevent an accident even when the observer erroneously observes a strong light-generating object such as the sun.

10 Claims, 1 Drawing Sheet

SAFETY DEVICE FOR TELESCOPE

TECHNICAL FIELD

The present invention relates to a safety device for a telescope, and more specifically to a safety device for a telescope that prevents the eyes of an observer from being damaged when a strong light-generating object such as the sun enters the field of vision.

BACKGROUND ART

Sight-seeing telescopes that can be used by inserting a coin are frequently provided to enable a distant view to be enjoyed at sight-seeing resorts having a sweeping view. If the sun is erroneously observed through such sight-seeing telescopes, the eyes can suffer major damage from the energy involved. To prevent such accidents, a notice is attached warning against viewing the sun.

However, it is difficult to completely exclude such a risk using just a warning notice. Such an accident would successfully be prevented if a warning could be emitted, closing the optical path of the telescope or attenuating the quantity of light when it seems that the sun is going to enter the telescope's field of vision.

Taking such facts into account, the present invention intends to provide a safety device for a telescope that can prevent the eyes of an observer from being damaged when a strong light-generating object such as the sun enters the field of vision.

SUMMARY OF THE INVENTION

To achieve this object, the present invention employs an arrangement having means for measuring a quantity of light incident into a field of vision that is a predetermined angle larger than the telescope's actual field of vision, and means for closing the telescope's optical path or attenuating the quantity of light to a safe level when the quantity of light is larger than a predetermined quantity of light.

DETAILED DESCRIPTION OF THE INVENTION

The invention will be explained in detail below with reference to the embodiment as shown in Figures.

Figure 1:
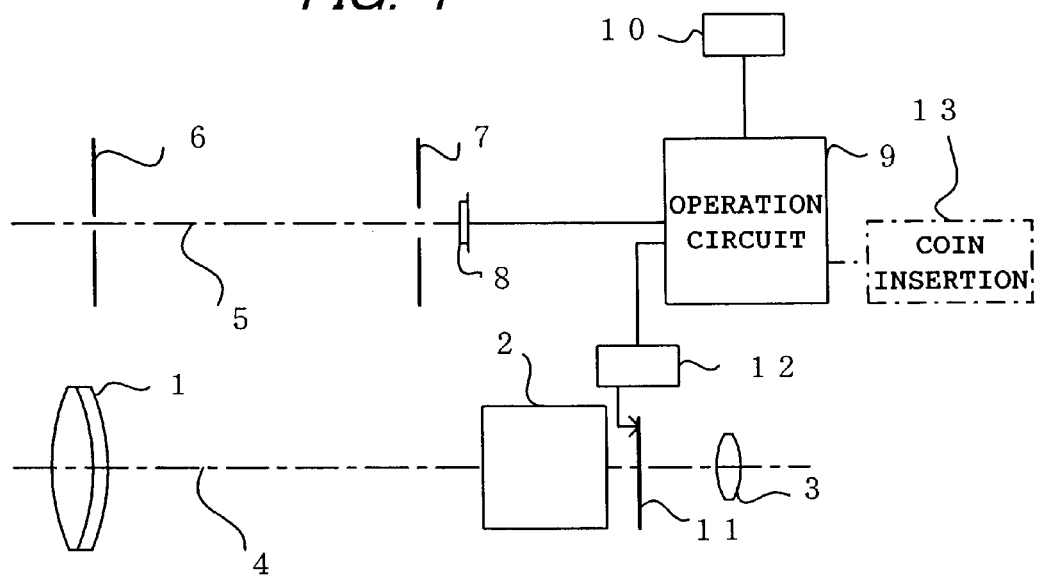
FIG. 1 is an optical diagram showing the arrangement of the safety device for a telescope of the present invention.

FIG. 1 shows one embodiment of a safety device for a sight-seeing telescope. In FIG. 1, an objective lens 1, an erecting prism 2 and an ocular lens 3 are disposed on the optical axis 4 of the telescope. An observer can view a distant object via the ocular lens 3.

A pin hole 6, a field stop 7 having a field of vision a predetermined angle larger than the telescope's actual field of vision, and a photoelectric element 8 are disposed on an axis 5 in parallel to the optical axis 4 of the telescope. A beam of light from the object observed by means of the telescope falls incident on the photoelectric element 8 via the pin hole 6 and the field stop 7. An operation circuit 9 amplifies the output of the photoelectric element 8 and determines whether or not a predetermined quantity of light falls thereon. If the operation circuit 9, supplied with electric power by a power supply 10, determines that the quantity of light incident on the photoelectric element 8 is in excess of the predetermined quantity, a shutter drive unit 12 inserts a shutter 11 into the telescope's optical axis 4, blocking the beam of light impinging on the observer via the ocular lens 3.

According to the embodiment of the invention, a warning is emitted or a safety countermeasure is effected when a ray of light from the sun or another object having a high light intensity seems about to enter the telescope's field of vision, for example, when the sun has entered within a half-angle of approximately 2° including the field of vision periphery with the assumption that the half-angle of the actual field of vision of the telescope is 1°. For this, the pin hole 6 is given a diameter of 1 mm, and the field stop 7 having an aperture diameter of 2.6 mm is disposed 50 mm behind the pin hole 6. The photoelectric element 8 that is able to cover that aperture diameter is disposed directly behind the field stop 7.

Figure 2:
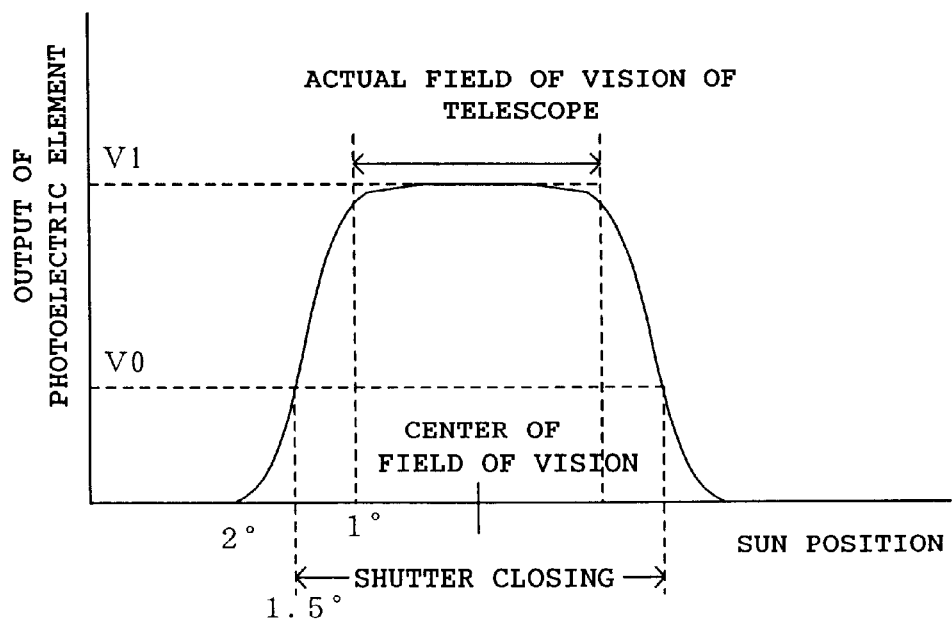
FIG. 2 is a diagram showing the relationship between the position of the sun in or near the field of vision and the output of a photoelectric element.

In this arrangement, when the optical axis 4 of the telescope moves toward the sun, a spot substantially 1 mm in diameter is projected in the vicinity of the field stop 7. When the sun comes closer to the field of vision, to its half-angle of 2°, the spot is projected at a point that is 1.75 mm (50 mm×tan 2°) away from the center of the field stop 7. Since the radius of the spot is approximately 0.5 mm, the photoelectric element 8 receives the sun's rays and the output of the photoelectric element 8 starts to rise, as shown in FIG. 2. When the sun comes closer, to the half-angle of 1.5°, half of the spot enters the aperture of the field stop 7, causing a further increase in the output of the photoelectric element 8. When the sun is at the half-angle of 1° the output of the photoelectric element 8 reaches the approximately peak value V1. At this point, the sun starts to enter the telescope's field of vision.

The operation circuit 9 is set so that, when the output of the photoelectric element 8 reaches a set level V0, the shutter drive unit 12 is activated to insert the shutter 11 into the optical axis 4 of the telescope. Thus, by setting V0 at an appropriate level, the optical axis or path of the telescope can be closed by the shutter 11 before the sun enters the telescope's actual field of vision, thereby preventing damage to the eyes of the observer.

The shutter 11 can be a liquid crystal shutter that blocks light transmission by changing the density thereof, or it can be an ND filter that attenuates the quantity of the transmitted light to an adequately safe level.

When the telescope is a sight-seeing telescope it has a coin insertion device 13, as shown by a phantom line in FIG. 1. The insertion of a coin into the coin insertion device 13 causes the shutter drive unit 12 to remove the shutter 11 from the optical axis or path, and the shutter 11 is inserted into the optical axis or path when the output of the photoelectric element exceeds a set level.

It is also possible to use an arrangement that causes a warning sound to be emitted and a warning light to come on to inform an observer that the sun has come close to the field of vision.

Such an apparatus is only necessary when the sun is out, that is, in the daytime when the weather is fine, so it is also possible to use a solar battery for the power 10 supply of the operation circuit and the photoelectric element.

Industrial Applicability

As described in the foregoing, in accordance with the invention, the optical path of the telescope is closed or a quantity of light is attenuated to a safe level when the quantity of light falling incident within a field of vision a predetermined angle larger than a telescope's actual field of vision exceeds a predetermined quantity of light. This enables a risk such as damage to the eyes of an observer to be eliminated to prevent an accident even when the observer erroneously observes a strong light-generating object such as the sun.

What is claimed is:

1. A safety device for a telescope, comprising:

measuring means for measuring a quantity of light incident within a field of vision that has a predetermined angle larger than that of an actual field of vision of the telescope, the measuring means comprising a photoelectric element that measures a quantity of light falling incident thereon via a pin hole, and a field stop having a field of vision a predetermined angle larger than the actual field of vision of the telescope, the photoelectric element and the field stop being disposed on an axis parallel to an optical axis of the telescope; and means for blocking the telescope's optical axis, or attenuating the quantity of light incident on the telescope's optical axis to a safe level, when the quantity of light is larger than a predetermined quantity of light.

2. A safety device for a telescope according to claim 1, wherein a solar battery is used as a power supply for the photoelectric element.

3. A safety device for a telescope according to claim 1, wherein the means for closing blocking the telescope's optical axis comprises a shutter, the shutter being removed from the telescope's optical axis when a coin is inserted and the shutter being inserted into the telescope's optical axis when the quantity of light exceeds the predetermined quantity of light.

4. A safety device for a telescope according to claim 3, wherein a warning is emitted when the quantity of light exceeds the predetermined quantity of light.

5. A safety device for a telescope, comprising:

measuring means disposed outside the an optical path axis of a telescope's main body and including a photoelectric element that measures a quantity of light falling incident thereon via a pin hole, and a field stop having a field of vision a predetermined angle larger than an actual field of vision of the telescope, the photoelectric element and the field stop being disposed on an axis in parallel to the optical axis of the telescope's main body, and means for blocking the telescope's optical axis, or attenuating the quantity of light incident on the optical axis to a safe level, when the quantity of light is larger than a predetermined quantity of light.

6. A safety device for a telescope according to claim 5, wherein the means for closing blocking the telescope's optical axis comprises a shutter, which unblocks the telescope's optical axis when a coin is inserted and blocks the telescope's optical axis when the quantity of light exceeds the predetermined quantity of light.

7. A safety device for a telescope according to claim 6, wherein a solar battery is used as a power supply for the photoelectric element.

8. A safety device for a telescope according to claim 7, wherein a warning is emitted when the quantity of light exceeds the predetermined quantity of light.

9. A safety device for a telescope according to claim 5, wherein a solar battery is used as a power supply for the photoelectric element.

10. A safety device for a telescope according to claim 5, wherein a warning is emitted when the quantity of light exceeds the predetermined quantity of light.

* * * * *